May 5, 1953  L. K. MOREY  2,637,214
SHEAVE
Filed Dec. 9, 1949
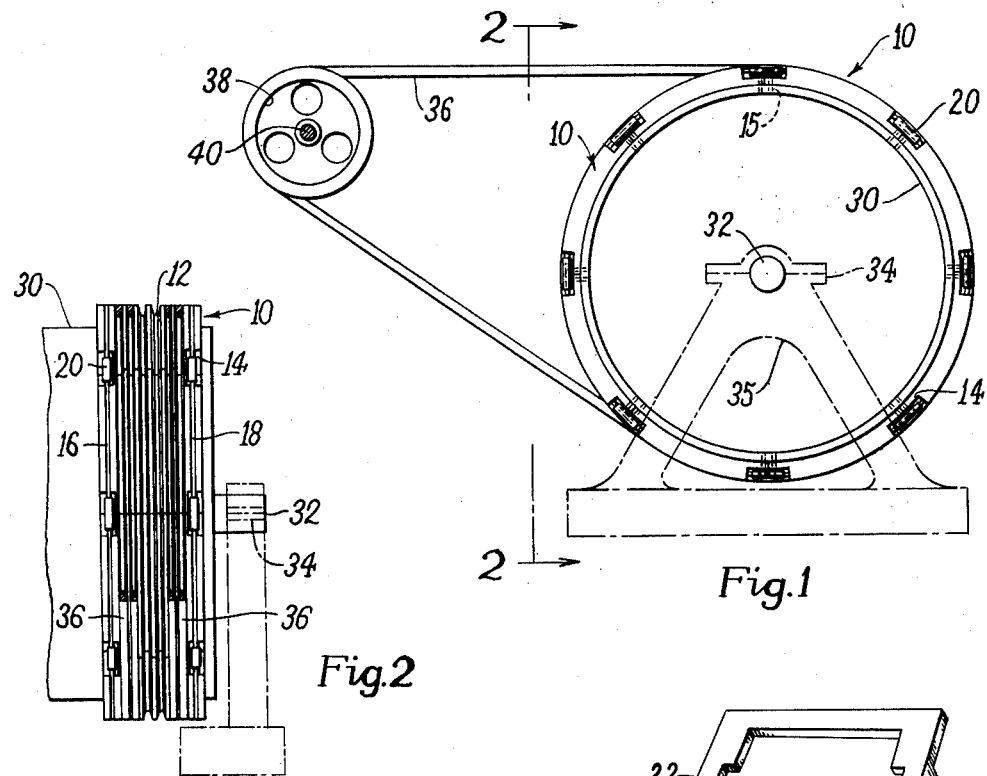
Fig.1
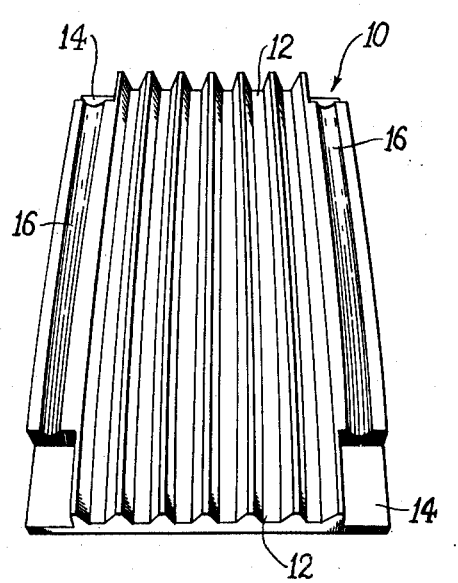
Fig.2
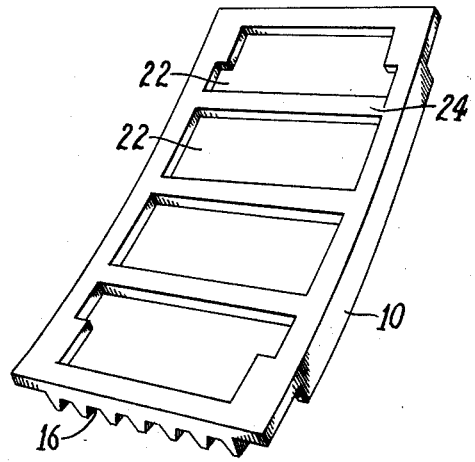
Fig.4
Fig.3
INVENTOR.
Leon K. Morey
BY
Haag, Kilburn & Carlson
ATTORNEYS.

Patented May 5, 1953

2,637,214

UNITED STATES PATENT OFFICE 2,637,214

SHEAVE

Leon K. Morey, Gloversville, N. Y.

Application December 9, 1949, Serial No. 132,175

7 Claims. (Cl. 74—230.5)

This invention relates to a sheave, and more particularly to sheave members adapted to be assembled around the surface of an object to be rotated.

An object of the invention is to provide a simple and practical sectional sheave.

Another object of the invention is to provide sheave means the diameter of which may be varied.

Another object of the invention is to provide a sheave comprising a plurality of parts which may be readily positioned on the object to be rotated.

Another object of the invention is to provide sheave sections which may be assembled to form an annular sheave.

Another object of the invention is to provide around any surface sheave means for a number of belts.

Another object of the invention is to provide sheave means of the kind described the diameter of which may be increased to compensate for expansion or contraction of the surface to which it is applied.

Other objects of the invention will be in part obvious or in part pointed out hereinafter.

The invention will be best understood if the following description is read in connection with the drawings in which—

Figure 1 is a side elevation of a drum with sheave members embodying the invention assembled around the surface of the drum, showing driving belt means for rotating the drum frictionally engaged in the grooves of said sheave means.

Figure 2 is a front elevation, as seen looking in the direction of the arrows 2—2 in Figure 1, of part of the drum with the sheave means assembled thereon, Figure 3 is a perspective view of a sheave member or section showing its outer or grooved surface, and Figure 4 is a perspective view of the under surface of a sheave member or section.

When it is desired to rotate a barrel, cylinder, drum or the like a very large torque is required if applied through a unitary sheave of the conventional kind which is of relatively small diameter and mounted on the axle or trunnion of the said barrel, cylinder, drum or the like. I have overcome this problem with relation to rotation of objects of the above mentioned kind, and particularly those of large diameter, by providing a number of thin, wide arcuate members 10, each having a grooved surface, and disposing them in end to end relation around the periphery of the object to be rotated, thus forming an annular, sectional, and more or less discontinuous, sheave around the said object. The members 10 are preferably but not necessarily moulded, of a strong light and somewhat flexible material such as Duralumin, although the members may be made of a wide variety of material including various metals, as for example, cast iron, sheet steel, or wood, or plastic. It is desirable that the members 10 be somewhat bendable so that without being formed with the exact curvature of a surface they may nevertheless be made to substantially conform to the curvature of the surface, thus making it possible to apply a given set of members 10 to any of a number of surfaces of different circumferential measurement.

Each member 10 has a grooved outer surface comprising preferably a number of belt receiving grooves 12 extending the full length of the member, and each member 10 of an assemly is similarly grooved so that when the members 10 are arranged in abutting or substantially abutting end to end relationship the grooves of one member 10 will be aligned with corresponding grooves of the other members 10 thus forming an annular sheave with a number of endless grooves around its periphery.

In the embodiment of the invention illustrated herein each sheave segment or member 10 has a number of ungrooved areas 14 of reduced thickness through which fastening means 15, such as screws, or dowel pins, for example, may be inserted to hold the member on the surface to which it has been applied. I have obtained very satisfactory results using wood screws when the segments are applied to a wood surface, and using tapered dowels to secure the segments on surfaces of cast iron and steel.

In the more or less rectangular members 10 shown herein the said ungrooved portions are positioned at the corners of the member. A groove 16 is provided along each lateral edge of each member 10, and extending between areas 14 and therefore terminating short of the ends of the member. Grooves 16 are provided to receive the hoops, straps or cables 18 for holding the segments 10 in adjustable relation on the surface to which they are applied. The members 18 are thus independent fastening means which may be supplemented by the screws or dowels 15, which are removed if it is desired to adjust the spacing between adjoining members. The members 18 may be formed in sections, the sections being joined together by turnbuckles 20, which may conveniently be positioned in the spaces provided between the opposed ends of grooves 16 of adjoining members 10 and over said areas 14 respectively, and by which tension may be exerted on the members 10 to cause them to bend somewhat to conform to the shape of the surface to which they are applied. Also by means of the turnbuckles, the hoops, straps, or cables 18 may be lengthened or shortened to increase or decrease the diameter of the annular assembly of members 10, applied around a surface to be rotated, to compensate for expansion or contraction of said surface. This is an important advantage of my means when the segments 10 are applied to a surface subject to shrinkage or expansion, such for example as a wooden surface. In applying the segments to such a surface I prefer to set them with their adjacent ends approximately 1/8 inch apart to allow for shrinkage. They can be set further apart to compensate for expansion.

As shown herein the under or reverse surface of each member 10 may be lightened by having portions of reduced thickness 22, separated by strengthening cross ribs 24, and surrounded by the strengthening edge portion 26. When the member 10 is applied to a surface the portions 22 tend to be evacuated of air or gas thus causing the members 10 to cling to the surface by suction.

In the embodiment of the invention shown in Figures 1 and 2 a drum 30 has the trunnions 32 which are received in pillow blocks 34 at the top of support members 35 respectively. Disposed around the drum surface in end to end relation are the members 10 with their grooves aligned, and seated in said grooves, and extending slightly more than 180 degrees around the assembled sheave, are belts 36 which may be V-belts and, as shown in Figure 1, may also extend around and be driven by the sheave 38 mounted on shaft 40 which may be rotatably supported by any suitable means (not shown) and driven by any suitable source of power.

The sheave means described herein has the advantage of flexibility in application. It may be made in segments of any size to fit any surface. The segments 10 can be made as narrow or as wide as desired to accommodate the necessary number of belts 36 to drive the load, and in any length. The segments may be made of very light material, such for example, as Duralumin thus effecting a great reduction in weight compared to a cast-iron sheave for example, with resultant easier handling and installation. And, if made of flexible material the bendable character of the segments makes it possible to use the same segments on surfaces of different diameters. Thus segments of a given contour, made of bendable material such as Duralumin, can be applied to surfaces differing in diameter from approximately six feet to nine feet. I have repeatedly and successfully used the same segments on drums differing in diameter from 7½ to 8½ feet.

I have obtained very satisfactory results with a sheave assembly comprising twelve segments applied around a surface of eight-foot diameter, drawing a 2-ton dead weight load with a reverse shock-load of 1000 lbs. sixteen times a minute.

It will thus be seen that there has been provided by this invention a method and apparatus, in which the various objects hereinabove set forth together with many thoroughly practical advantages are successfully achieved. As various possible embodiments might be made of the mechanical features of the above invention and as the art herein described might be varied in various parts, all without departing from the scope of the invention, it is to be understood that all matter hereinbefore set forth or shown in the accompanying drawing is to be interpreted as illustrative and not in a limiting sense.

What I claim is:

1. The method of applying a sheave means to obtain a maximum of torque on an object to be rotated which comprises, disposing in end to end relation around the surface of said object a number of relatively thin, wide arcuate members each similarly grooved, with V-grooves and binding said members on said surface and making them conform to the curvature of said surface by tightening around them endless cables extending around said object and over said members.

2. The method of applying a sheave means to obtain a maximum of torque on an object to be rotated which comprises, disposing around the surface of said object a number of thin, wide arcuate members each having in its external surface a number of V-belt grooves and a plurality of other grooves for receiving endless fastening means, placing endless fastening means over and around all of said members seated in said other grooves respectively, and tightening them to conform said thin members to the shape of the surface and to bind them on said surface.

3. A V-belt sheave for application around the surface of a barrel or the like comprising a number of thin, wide segments each having therein a number of V-belt grooves, said segments being disposed around said surface forming a discontinuous ring, and endless members adjustable in circumference extending over said segments successively and binding them onto said surface.

4. A sheave comprising a segmental ring divided into a number of segments disposed in end to end relation and endless members extending around the ring and adjustable in length, each of said segments of said ring having a portion which is grooved for the reception of driving belts and an ungrooved portion through which may be passed means for securing the segment to a surface around which the sheave is assembled.

5. A sheave comprising a number of thin, wide and at least somewhat flexible arcuate segments, comprising an annular ring when assembled, having on one surface a number of belt receiving grooves disposed in adjoining parallel planes, and means for holding said segments in end to end relation around a surface of an object to be rotated and for exerting flexing pressure on said segments to conform them to the curvature of the surface of an object to be rotated, said means comprising endless members adjustable in circumference and means on the surface of said segments for receiving said endless members respectively.

6. A sheave member comprising a thin, wide sheet having on one surface a number of V-belt receiving grooves disposed in adjoining parallel planes, and having additional groove means for endless fastening members adapted to extend around an object to which the member is applied and over the said surface of said member to bind said member to said object, and endless fastening members receivable in said groove means.

7. A sheave member comprising a thin, wide sheet having on one surface a number of belt receiving grooves disposed in adjoining parallel planes, and additional groove means for endless members adapted to be received in said additional groove means and extend around an object to which the member is applied to bind said member to said object, the said belt receiving grooves being continuous and the said additional groove means being discontinuous leaving areas of said member of reduced height adjoining the ends of said additional groove means, and endless members receivable in said groove means and comprising turn buckles adapted to be received in said areas of reduced height respectively.

LEON K. MOREY.

References Cited in the file of this patent

UNITED STATES PATENTS

| Number | Name | Date |
|---|---|---|
| 411,761 | Davies | Sept. 24, 1889 |
| 1,100,541 | Crawford | June 16, 1914 |
| 1,241,726 | Fontaine | Oct. 2, 1917 |
| 1,402,489 | Fowler | Jan. 3, 1922 |
| 1,593,936 | Goodwin | July 27, 1926 |